United States Patent
Hirosawa et al.

(10) Patent No.: US 9,395,586 B2
(45) Date of Patent: Jul. 19, 2016

(54) LIQUID CRYSTAL DISPLAY DEVICE

(75) Inventors: Jin Hirosawa, Tokyo (JP); Arihiro Takeda, Tokyo (JP); Nobuko Fukuoka, Tokyo (JP); Yusuke Morita, Tokyo (JP); Kazuya Daishi, Tokyo (JP)

(73) Assignee: Japan Display Inc., Tokyo (JP)

( * ) Notice: Subject to any disclaimer, the term of this patent is extended or adjusted under 35 U.S.C. 154(b) by 1021 days.

(21) Appl. No.: 13/242,321

(22) Filed: Sep. 23, 2011

(65) Prior Publication Data

US 2012/0099070 A1   Apr. 26, 2012

(30) Foreign Application Priority Data

Oct. 20, 2010   (JP) ................................ 2010-235368

(51) Int. Cl.
*G02F 1/1343* (2006.01)

(52) U.S. Cl.
CPC ..................... *G02F 1/134309* (2013.01); *G02F 2001/134318* (2013.01); *G02F 2001/134381* (2013.01)

(58) Field of Classification Search
CPC ..................... G02F 1/136286; G02F 1/133555; G02F 1/134309; G02F 2001/134381; G02F 1/136213
See application file for complete search history.

(56) References Cited

U.S. PATENT DOCUMENTS

| | | | |
|---|---|---|---|
| 5,745,207 A * | 4/1998 | Asada et al. | 349/141 |
| 5,870,160 A * | 2/1999 | Yanagawa et al. | 349/141 |
| 6,266,116 B1 | 7/2001 | Ohta et al. | |
| 2001/0010575 A1 * | 8/2001 | Yoshida et al. | 349/141 |
| 2004/0109119 A1 | 6/2004 | Lee | |
| 2004/0165136 A1 | 8/2004 | Sugiyama et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2008/0062358 A1 | 3/2008 | Lee et al. | |
| 2008/0180590 A1 | 7/2008 | Lee et al. | |
| 2008/0180623 A1 | 7/2008 | Lee et al. | |

(Continued)

FOREIGN PATENT DOCUMENTS

| CN | 1504817 A | 6/2004 |
|---|---|---|
| JP | 06-222397 | 8/1994 |

(Continued)

OTHER PUBLICATIONS

U.S. Appl. No. 13/348,906, filed Jan. 12, 2012, Morita, et al.

(Continued)

*Primary Examiner* — Edward Glick
*Assistant Examiner* — Anthony G Quash
(74) *Attorney, Agent, or Firm* — Oblon, McClelland, Maier & Neustadt, L.L.P.

(57) ABSTRACT

In one embodiment, a liquid crystal display device includes a first substrate and a second substrate. In the first substrate, gate lines extend in a first direction, and a first source line and a second source line extend in a second direction orthogonally crossing the first direction. A pixel electrode having a first belt-like main electrode is arranged approximately in a central portion between the first source line and the second source line and extending in the second direction. A first belt-like sub-electrode covers the gate line between the first source line and the second source line and extending in the first direction. The second substrate includes a counter electrode having a second main electrode arranged on the first and second source lines and extending in the second direction. A liquid crystal layer is held between the first substrate and the second substrate.

5 Claims, 8 Drawing Sheets

(56) References Cited

U.S. PATENT DOCUMENTS

| | | | |
|---|---|---|---|
| 2008/0186439 A1 | 8/2008 | Kwon et al. | |
| 2008/0211792 A1* | 9/2008 | Lee et al. | 345/204 |
| 2009/0180069 A1* | 7/2009 | Nishimura | 349/139 |
| 2009/0207363 A1 | 8/2009 | Hirosawa | |

FOREIGN PATENT DOCUMENTS

| | | | | |
|---|---|---|---|---|
| JP | 07-159807 | | 6/1995 | |
| JP | 9-160041 | | 6/1997 | |
| JP | 09-160042 | | 6/1997 | |
| JP | 09-160061 | | 6/1997 | |
| JP | 10-003092 | * | 1/1998 | G02F 1/136 |
| JP | 10-026765 | | 1/1998 | |
| JP | 10-090708 | | 4/1998 | |
| JP | 11-24077 A | | 1/1999 | |
| JP | 2003-322869 A | | 11/2003 | |
| JP | 2004-94190 A | | 3/2004 | |
| JP | 2005-003802 | | 1/2005 | |
| JP | 3644653 | | 2/2005 | |
| JP | 2005-242307 | | 9/2005 | |
| JP | 2009-192822 | * | 8/2009 | G02F 1/1343 |

OTHER PUBLICATIONS

U.S. Appl. No. 13/350,337, filed Jan. 13, 2012, Fukuoka, et al.
U.S. Appl. No. 13/369,057, filed Feb. 8, 2012, Hirosawa.
U.S. Appl. No. 13/405,799, filed Feb. 27, 2012, Hirosawa, et al.
U.S. Appl. No. 13/469,458, filed May 11, 2012, Takeda, et al.
U.S. Appl. No. 13/470,578, filed May 14, 2012, Takeda, et al.
U.S. Appl. No. 13/074,463, filed Mar. 29, 2011, Jin Hirosawa.
U.S. Appl. No. 13/542,049, filed Jul. 5, 2012, Takeda, et al.
U.S. Appl. No. 13/562,647, filed Jul. 31, 2012, Takeda, et al.
Japanese Office Action issued Oct. 2, 2012 in Patent Application 2010-235368 (English Translation only).
English translation of the Chinese Office Action issued Jan. 6, 2014 in Patent Application No. 201110311039.1.
U.S. Appl. No. 13/303,606, filed Nov. 11, 2011, Hirosawa.
U.S. Appl. No. 14/507,442, filed Oct. 6, 2014, Morita, et al.
U.S. Appl. No. 14/750,484, filed Jun. 25, 2015, Hirosawa.

* cited by examiner

LIQUID CRYSTAL DISPLAY DEVICE

CROSS-REFERENCE TO RELATED APPLICATION

This application is based upon and claims the benefit of priority from Japanese Patent Application No. P2010-235368, filed Oct. 20, 2010, the entire contents of which are incorporated herein by reference.

FIELD

Embodiments described herein relate generally to a liquid crystal display device.

BACKGROUND

In recent years, a flat panel display is developed briskly, and especially the liquid crystal display device gets a lot of attention from advantages, such as a light weight, a thin shape, and low power consumption. Especially, in an active matrix type liquid crystal display device provided with a switching element in each pixel, a structure using lateral electric field (fringe electric field is also included), such as IPS (In-Plane Switching) mode and FFS (Fringe Field Switching) mode, attracts attention. The liquid crystal display device using the lateral electric field mode is equipped with pixel electrodes formed and a counter electrode formed in an array substrate, respectively. Liquid crystal molecules are switched by the lateral electric field substantially in parallel to the principal surface of the array substrate.

On the other hand, another technique is also proposed, in which the liquid crystal molecules are switched using the lateral electric field or an oblique electric field between the pixel electrode formed in the array substrate and the counter electrode formed in the counter substrate.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION OF THE INVENTION

Figure 1:
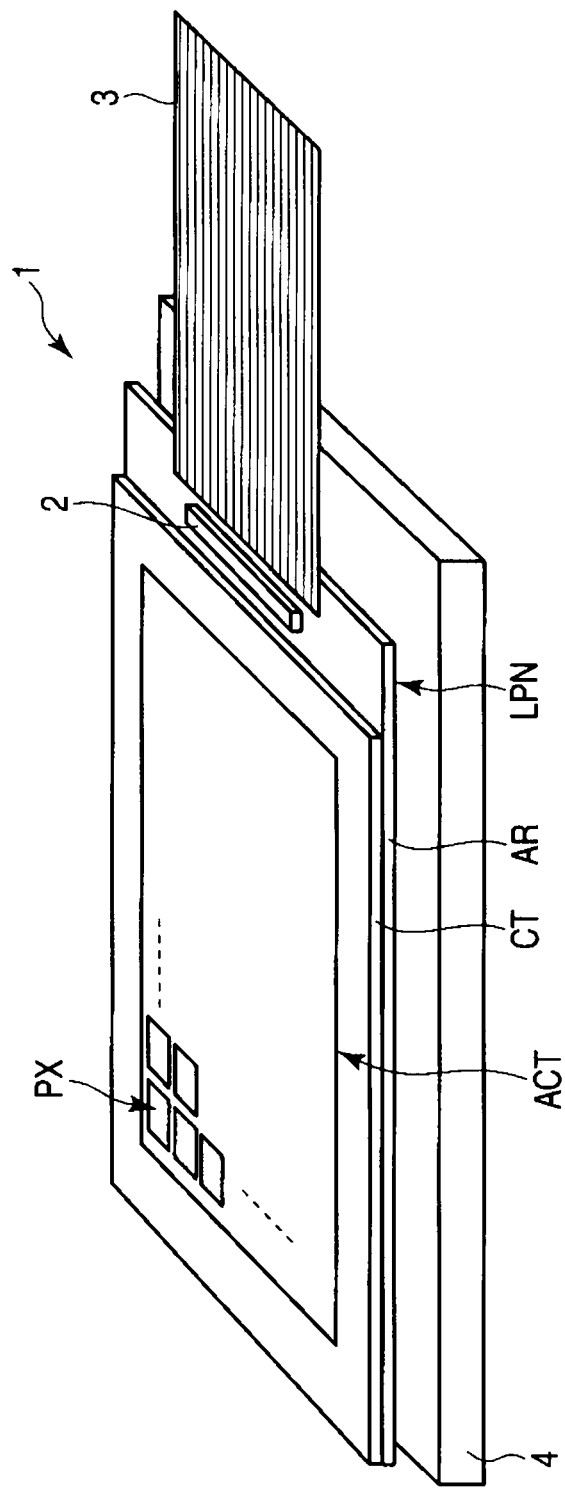
FIG. 1 is a figure schematically showing a structure of a liquid crystal display device in one embodiment.

A liquid crystal display device according to an exemplary embodiment of the present invention will now be described with reference to the accompanying drawings wherein the same or like reference numerals designate the same or corresponding portions throughout the several views.

According to one embodiment, the liquid crystal display device formed of a plurality of pixels includes: a first substrate including; gate lines extending in a first direction; a first source line and a second source line extending in a second direction orthogonally crossing the first direction; and a pixel electrode having a first belt-like main electrode arranged approximately in a central portion between the first source line and the second source line and extending in the second direction, and a first belt-like sub-electrode covering the gate line between the first source line and the second source line and extending in the first direction; a second substrate including a counter electrode having a second main electrode arranged on the first and second source lines and extending in the second direction; and a liquid crystal layer held between the first substrate and the second substrate.

According to other embodiment, a liquid crystal display device formed of a plurality of pixels includes: a first substrate including; gate lines extending in a first direction; a first source line and a second source line extending in a second direction orthogonally crossing the first direction; and a pixel electrode having a first belt-like main electrode extending in the first direction and a first belt-like sub-electrode covering the gate line between the first source line and the second source line and extending the first direction; a second substrate including a counter electrode having a second main electrode arranged approximately in a central portion between the first main electrode and the first sub-electrode and extending in the first direction; and a liquid crystal layer held between the first substrate and the second substrate.

According to other embodiment, a liquid crystal display device formed of a plurality of pixels includes: a first substrate including; gate lines extending in a first direction; a first source line and a second source line extending in a second direction orthogonally crossing the first direction; and a pixel electrode having a first belt-like main electrode extending in an oblique direction crossing the first and second directions, and a first belt-like sub-electrode covering the gate line between the first source line and the second source line and extending in the first direction; a second substrate including a counter electrode having a second belt-like main electrode extending in an oblique direction in parallel with the first main electrode, and a second sub-electrode arranged on the first sub-electrode and extending in the first direction; and a liquid crystal layer held between the first substrate and the second substrate.

FIG. 1 is a figure schematically showing the structure of the liquid crystal display device according to one embodiment.

The liquid crystal display device 1 includes an active-matrix type liquid crystal display panel LPN, a driver IC chip 2, a flexible wiring substrate 3, a back light 4 for illuminating the liquid crystal display panel LPN, etc.

The liquid crystal display panel LPN is equipped with an array substrate AR as a first substrate, a counter substrates CT as a second substrate arranged opposing the array substrate AR, and a liquid crystal layer (not shown) held between the array substrate AR and the counter substrates CT. The liquid crystal display panel LPN includes an active area ACT which displays images. The active area ACT is constituted by a plurality of pixels PX arranged in the shape of a (m×n) matrix (here, "m" and "n" are positive integers).

A back light 4 is arranged on the back side of the array substrate AR in the illustrated example. Various types of backlights can be used as the backlight 4. For example, a light emitting diode (LED) or a cold cathode fluorescent lamp (CCFL), etc., can be applied as a light source of the back light 4. The explanation about its detailed structure is omitted.

Figure 2:
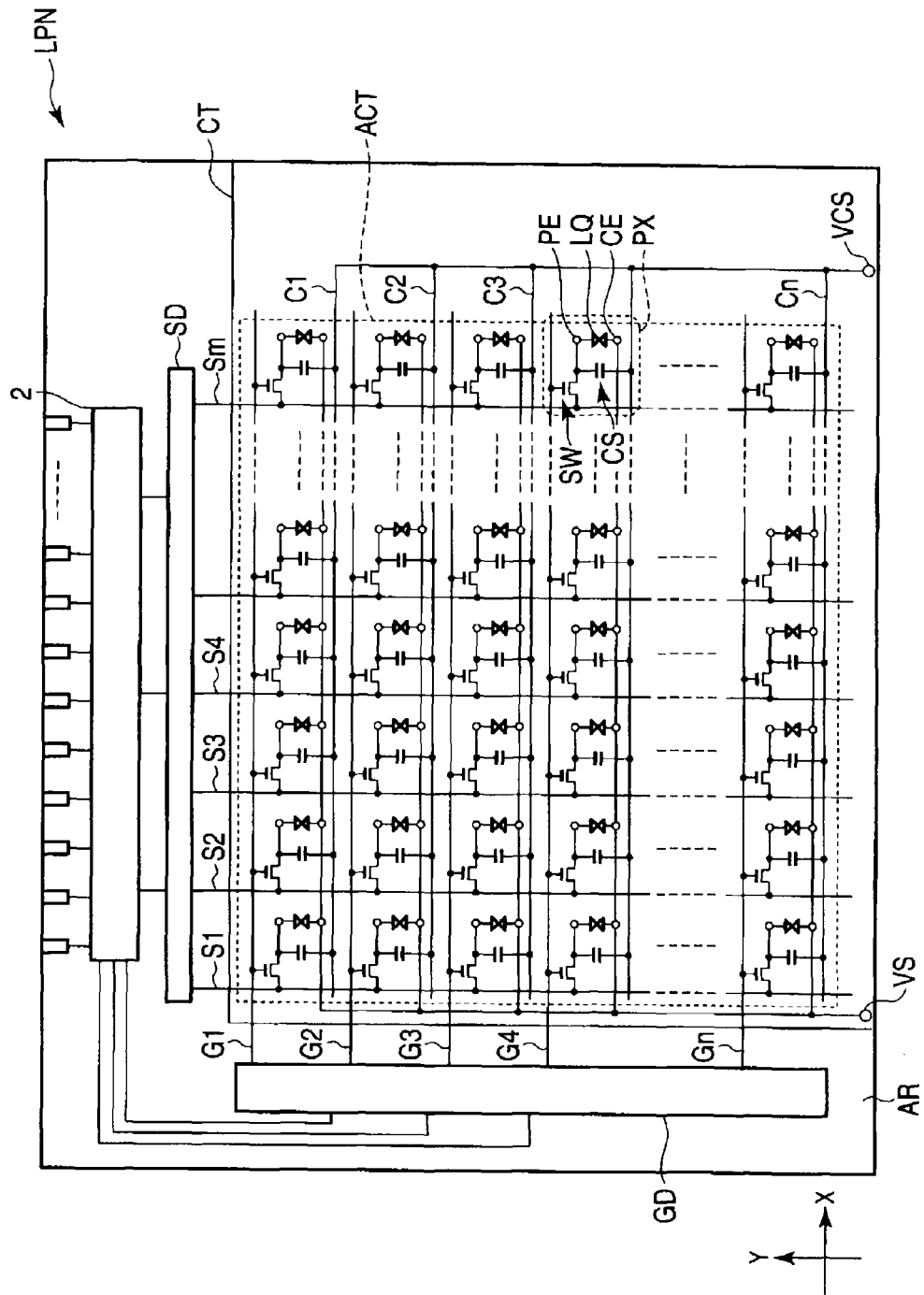
FIG. 2 is a figure schematically showing the structure and an equivalent circuit of the liquid crystal display panel shown in FIG. 1.

FIG. 2 is a figure schematically showing a structure and an equivalent circuit of the liquid crystal display panel LPN shown in FIG. 1.

The liquid crystal display panel LPN is equipped with "n" gate lines G (G1-Gn), "n" auxiliary capacitance lines C (C1-Cn), "m" source lines S (S1-Sm), etc., in the active area ACT. The gate line G and the auxiliary capacitance line C respectively extend in a first direction X. Moreover, the gate line G and the auxiliary capacitance line C are arranged in parallel each other in a second direction Y that intersects perpendicularly the first direction X in turns. The source lines S extend in the second direction Y that intersects the gate line G and the auxiliary capacitance line C in parallel. That is, the gate line G and the auxiliary capacitance line C orthogonally cross the source lines S.

Each gate line G is pulled out to the outside of the active area ACT, and is connected to a gate driver GD. Each source line S is pulled out to the outside of the active area ACT, and is connected to a source driver SD. At least a portion of the gate driver GD and the source driver SD is formed in the array substrate AR, for example, and the gate driver GD and the source driver SD are connected with a drive IC chip 2 having a controller and provided in the array substrate AR.

Each pixel PX includes a switching element SW, a pixel electrode PE, a counter electrode CE, etc. Retention capacitance Cs is formed, for example, between the auxiliary capacitance line C and the pixel electrode PE.

In addition, in the liquid crystal display panel LPN according to this embodiment, while the pixel electrode PE is formed in the array substrate AR, the counter electrode CE is formed in the counter substrate CT. The liquid crystal molecule of the liquid crystal layer LQ is switched mainly using the electric field formed between the pixel electrodes PE and the counter electrodes CE. The electric field formed between the pixel electrode PE and the counter electrode CE is a lateral electric field substantially in parallel to the principal surface of the array substrate AR or the principal surface of the counter substrate CT, or an oblique electric field inclined slightly with respect to the principle surface of the substrates.

The switching element SW is constituted by n channel type thin film transistor (TFT), for example. The switching element SW is electrically connected with the gate line G and the source line S. The (m×n) switching elements SW are formed in the active area ACT.

The pixel electrode PE is electrically connected with the switching element SW. The (m×n) pixel electrodes PE are formed in the active area ACT. The counter electrode CE is set to a common potential, for example. The counter electrode CE is arranged in common to the plurality of pixel electrodes PE through the liquid crystal layer LQ. The counter electrode CE is electrically connected with an electric power supply portion VS formed in the array substrate AR through an electric conductive component which is not illustrated. The auxiliary capacitance line C is electrically connected with a voltage impressing portion VCS to which the auxiliary capacitance voltage is impressed.

Figure 3:
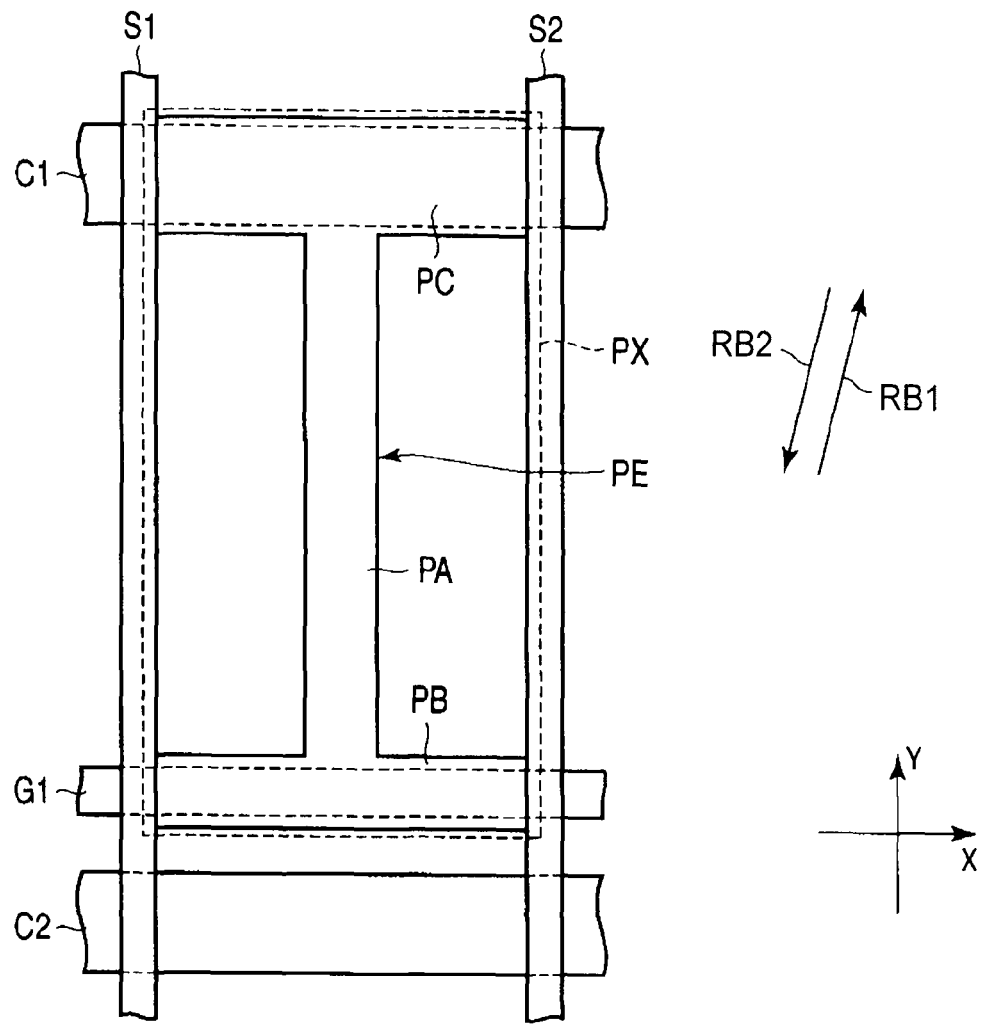
FIG. 3 is a plan view schematically showing the structure of an array substrate in which a pixel of the liquid crystal display panel shown in FIG. 2 is looked from a counter substrate side.

Hereinafter, the liquid crystal display device 1 according to the first embodiment is explained. FIG. 3 is a plan view schematically showing the structure of the array substrate AR in which the pixel PX of the liquid crystal display panel LPN shown in FIG. 2 is looked from the counter substrate CT side.

The gate line G1 and the auxiliary capacitance lines C1 and C2 extend in the first direction X, respectively. The source lines S1 and S2 are arranged in the both sides of the pixel sandwiching the pixel electrode PE therebetween and extending in the second direction Y, respectively. The gate line G1 is located between the auxiliary capacitance line C1 and the auxiliary capacitance line C2, adjacent to the auxiliary capacitance line C2.

In the illustrated example, the pixel PX corresponds to a rectangular region surrounded by the auxiliary capacitance line C1, the gate line G1 and the source line S1 and S2 as shown by a dashed line in figure. That is, the length of the pixel along with the second direction Y is longer than that along with the first direction X. The gate line G1 is arranged at one end portion of the pixel PX, and the auxiliary capacitance line C1 is arranged at another end portion of the pixel PX. Approximately rectangular openings are respectively formed between the source line S1 and the pixel electrode PE, and between the source line S2 and the pixel electrode PE.

The pixel electrode PE is electrically connected with the switching element whose illustration is omitted. The pixel electrode PE includes a first main electrode PA, a first sub-electrode PB and a capacitance portion PC. In addition, although only the pixel electrode PE arranged in one pixel PX is shown in the illustrated example, the pixel electrode of the same structure is arranged for other pixels, whose illustrations are also omitted.

Namely, the first main electrode PA is formed in a belt-like shape linearly extending in the second direction Y. The first main electrode PA is located in an approximately middle portion between the source line S1 and the source line S2. Moreover, the first main electrode PA extends from the auxiliary capacitance line C1 to the gate line G1.

The first sub-electrode PB is formed in a belt-like shape linearly extending in the first direction X. The first sub-electrode PB is arranged at the end portion of the pixel PX so as to cover the gate line G1 between the source line S1 and the source line S2. Moreover, the first sub-electrode PB is connected with one end portion of the first main electrode PA.

In this embodiment, although the both ends of the first sub-electrode PB is located on the edge of the source line S1 and the edge of the source line S2, respectively, the both ends may extend on the source line S1 and the source line S2. That is, the length of the first sub-electrode PB is set to be equal to or longer than the length of the gate line G1 between the source line S1 and the source line S2 in the first direction X. Furthermore, the width along with the second direction Y of the first sub-electrode PB is set to be equal to or longer than that of the gate line G1 along with the second direction Y. That is, the gate line G1 is not exposed from the first sub-electrode PB between the source line S1 and the source line S2.

The capacitance portion PC is formed in a belt-like shape linearly extending in the first direction X. The capacitance portion PC is arranged at another end portion of the pixel PX, and is arranged on the auxiliary capacitance line C1. Moreover, the capacitance portion PC is electrically connected with another end portion of the first main electrode PA. In addition, though the capacitance portion PC may be a portion of the pixel electrode PE (i.e., formed of the same material as the main electrode PA), the capacitance portion PC may be formed of other materials such as, a semiconductor layer of the switching element and the source line connected with the pixel electrode PE. The length of the capacitance portion PC along with the first direction X is set to be equal to or shorter than that of the auxiliary capacitance line C1 between the source line S1 and the source line S2 in the first direction X.

The capacitance portion PC is connected with the drain electrode of the switching element SW which extends on the auxiliary capacitance line C1. Thereby, the pixel electrode PE is electrically connected with the switching element SW. Moreover, a retention capacitance Cs is formed between the pixel electrode PE and the auxiliary capacitance line C1.

In the figure, RB1 shows a first rubbing direction of a first alignment film arranged on the surface of the array substrate AR, and RB2 shows a second rubbing direction of the second alignment film arranged on the surface of the counter substrate which is not illustrated. The first rubbing direction RB1 and the second rubbing direction RB2 are in parallel and in reverse each other. Moreover, the first direction RB1 and the second direction RB2 are slightly inclined, i.e., by several degrees with respect to the second direction Y, and the angle made by the first rubbing direction RB1 and the second rubbing direction RB2 with respect to the second direction Y is 7 degrees.

Figure 4:
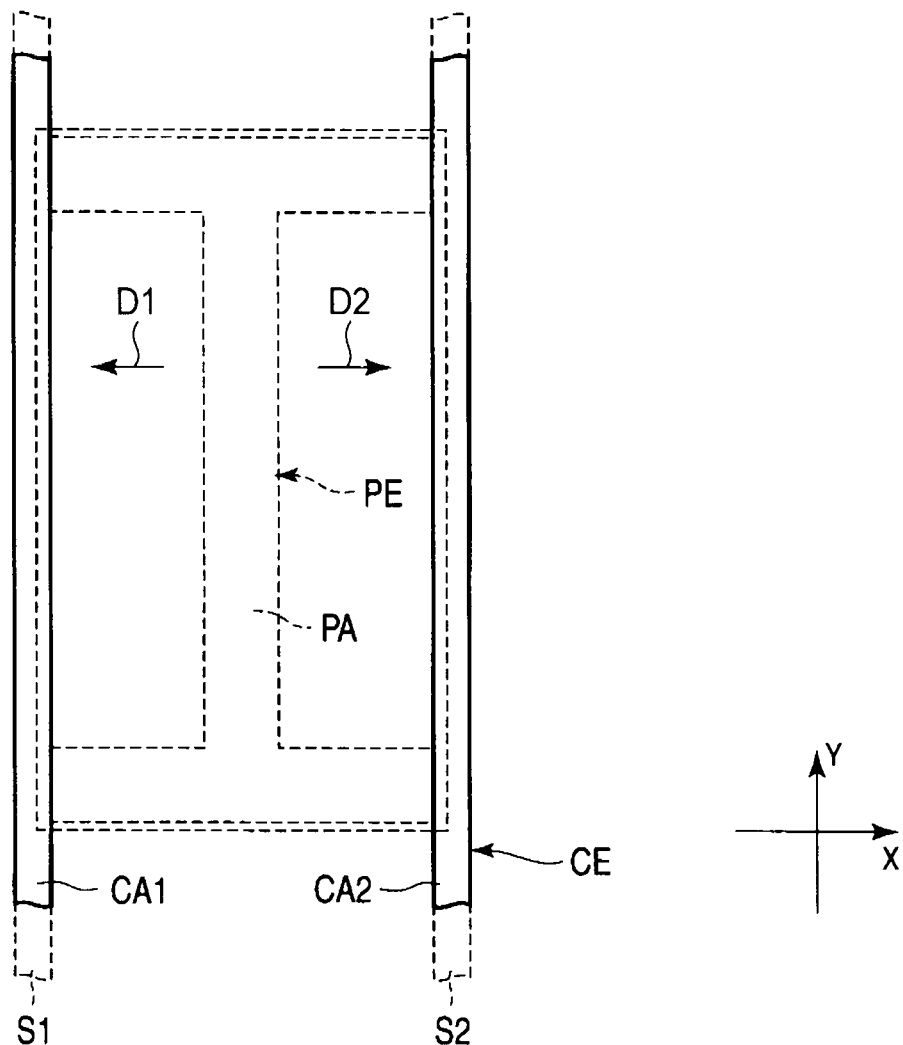
FIG. 4 is a plan view schematically showing the structure of the pixel in the counter substrate of the liquid crystal display panel shown in FIG. 2.

FIG. 4 is a plan view schematically showing the structure of the pixel PX in the counter substrate CT of the liquid crystal display panel LPN shown in FIG. 2.

The counter electrode CE includes second main electrodes CA1 and CA2. the second main electrodes CA1 and CA2 are respectively formed in a belt-like shape linearly extending in the second direction Y. The second main electrode CA1 is arranged on the source line S1. The second main electrode CA2 is arranged on the source line S2. As illustrated, the second main electrode CA1 on the source line S1, the second main electrode CA2 on the source line S2 and the first main electrode PA of the pixel electrode PE are arranged by turns keeping a constant interval along the first direction X without overlapping. That is, the intervals between the first main electrode PA and the second main electrode CA1, and between the first main electrode PA and the second main electrode CA2 along with the first direction X are the same, respectively. The transmitting portions which mainly contribute to the display in each pixel PX are respectively formed between the first main electrode PA and the second main electrode CA1, and between the first main electrode PA and the second main electrode CA2.

Figure 5A:
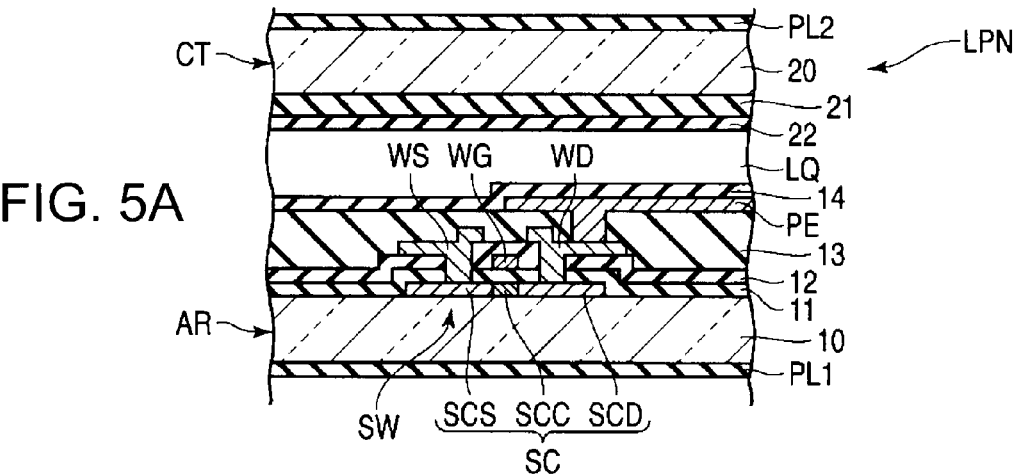
FIG. 5 is a figure schematically showing a cross-sectional structure of the liquid crystal display panel shown in FIG. 2.
Figure 5B:
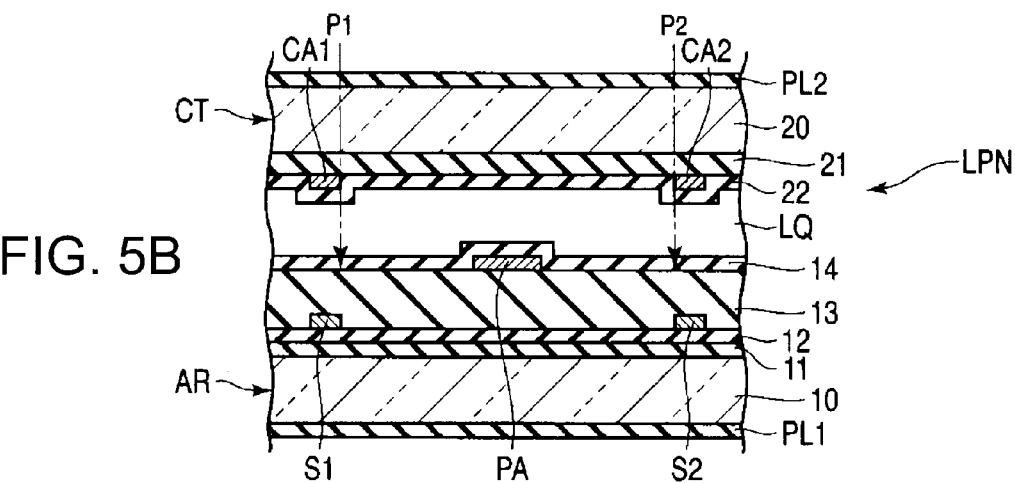
Figure 5C:
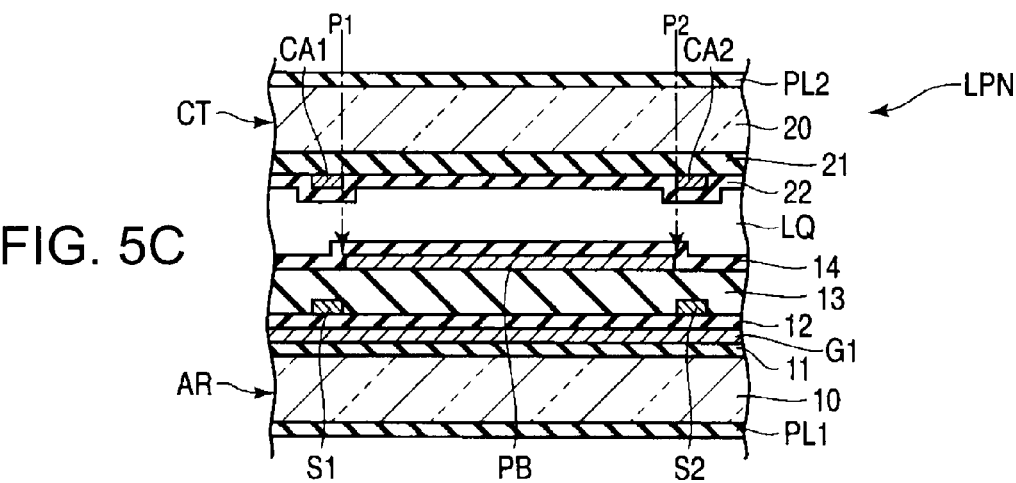

FIG. 5 is a figure schematically showing a cross-sectional structure of the liquid crystal display panel LPN shown in FIG. 2. In addition, FIG. 5A is a cross-sectional view including the switching element SW, FIG. 5B is a cross-sectional view of the pixel electrode PE containing the first main electrode PA in the first direction X, and FIG. 5C is a cross-sectional view of the pixel electrode PE containing the first sub-electrode PB in the first direction X.

That is, the array substrate AR is formed using a first transmissive insulating substrate 10, such as a glass substrate, etc. The array substrate AR is equipped with the switching element SW in an internal surface (i.e., a surface opposing the counter substrate CT) of the first insulating substrate 10. The switching element SW shown here is formed of a TFT of a top gated mode.

The switching element SW includes a semiconductor layer SC. The semiconductor layer SC can be formed by polysilicon, an amorphous silicon, etc. In this embodiment, the semiconductor layer SC is formed with poly-silicon, for example. The semiconductor layer SC of the switching element SW is formed on the first insulating substrate 10. The semiconductor layer SC has a source region SCS and a drain region SCD on both sides of a channel region SCC, respectively. In addition, an undercoat layer which is formed of an insulating film may interposed between the first insulating substrate 10 and the semiconductor layer SC. The semiconductor layer SC is covered with a gate insulating film 11. Moreover, the gate insulating film 11 is arranged also on the first insulating substrate 10.

The gate electrode WG is formed on the gate insulating film 11, and is located above the channel region SCC of the semiconductor layer SC. The gate line G1 is also formed on the gate insulating film 11. The gate electrode WG is electrically connected with the gate line G1. In addition, the gate electrode WG may be a portion of the gate line G1.

The gate electrodes WG and the gate line G1 may be formed using the same process and the same material as the auxiliary capacitance line C1, etc., which is not illustrated. The gate electrode WG and the gate line G1 are covered with a first interlayer insulating film 12. Moreover, the first interlayer insulating film 12 is arranged also on the gate insulating film 11.

A source electrode WS and a drain electrode WD of the switching element SW are formed on the first interlayer insulating film 12. The source electrode WS may be a portion of the source line S1. Moreover, in this figure, the source line S2 formed on the first interlayer insulating film 12 is also illustrated. The source electrode WS, the drain electrode WD, and the source lines S1 and S2 may be formed using the same material and the same process.

The source electrode WS is in contact with the source region SCS of the semiconductor layer SC through a contact hole which penetrates the gate insulating film 11 and the first interlayer insulating film 12. The drain electrode WD is in contact with the drain region SCD of the semiconductor layer SC through a contact hole which penetrates the gate insulating film 11 and the first interlayer insulating film 12. The gate electrodes WG, the source electrode WS, and the drain electrode WD are formed of electric conductive materials, such as molybdenum, aluminum, tungsten, and titanium, for example.

The switching element SW as described-above is covered with a second interlayer insulating film 13. That is, the source electrode WS, the drain electrode WD, and the source lines S1 and S2 are covered with the second interlayer insulating film 13. Moreover, the second interlayer insulating film 13 is arranged also on the first interlayer insulating film 12.

The pixel electrode PE is formed on the second interlayer insulating film 13. The pixel electrode PE is connected with the drain electrode WD through a contact hole which penetrates the second interlayer insulating film 13. The pixel electrode PE is formed by light transmissive conductive materials, such as Indium Tin Oxide (ITO), Indium Zinc Oxide (IZO), etc.

On the second interlayer insulating film 13, the first main electrode PA of the pixel electrode PE is located in the approximately middle between a position p1 on the source line S1 and a position p2 on the source line S2. The first sub-electrode PB is located on the gate line G1 extending from the position p1 to the position p2 on the second interlayer insulating film 13.

The pixel electrode PE is covered with a first alignment film 14. The first alignment film 14 is arranged also on the second interlayer insulating film 13, i.e., the first alignment film 14 is formed on the surface of the array substrate AR in which the surface contacts the liquid crystal layer LQ. The first alignment film 14 is formed of the material which shows a horizontal alignment characteristics, and rubbing processing as described-above is carried out in the first rubbing direction RB1.

On the other hand, the counter substrate CT is formed using a second transmissive insulating substrate 20, such as a glass substrate. The counter substrate CT includes a color filter layer 21, the counter electrode CE, etc., on an internal surface (i.e., a surface opposing the array substrate AR) of the second insulating substrate 20.

The color filter layer 21 is formed on the second insulating substrate 20. The color filter layer 21 is formed of colored resin materials, respectively colored in several different colors, for example, red, blue, and green i.e., three primary colors. Although not explained in full detail, the resin material colored in red is arranged corresponding to a red pixel, the resin material colored in blue is similarly arranged corresponding to a blue pixel, and the resin material colored in green is arranged corresponding to a green pixel.

The counter electrode CE is formed on the color filter layer 21. The counter electrode CE includes the second main electrodes CA1 and CA2 arranged so that lateral electric field is formed between the pixel electrodes PE and the counter electrode CE. The second main electrodes CA1 and CA2 are respectively located on the source line S1 and the source line S2. The counter electrode CE is formed of transmissive conductive material, such as ITO and IZO like the pixel electrode PE.

The surface of the counter electrode CE is covered with a second alignment film 22. The second alignment film 22 is arranged also on the second color filter layer 21, i.e., the second alignment film 22 is formed on the surface of the counter substrate CT in which the surface contacts the liquid crystal layer LQ. The second alignment film 22 is formed of the material which shows the horizontal alignment characteristics like the first alignment film 14, and the rubbing processing is carried out to the second alignment film 22 in the second rubbing direction RB2.

In addition, in the counter substrate CT, an overcoat layer which makes the unevenness of the surface of the color filter layer 21 flat may be arranged between the color filter layer 21, and the counter electrode CE and the second alignment film 22.

The array substrate AR and the counter substrate CT as mentioned-above are arranged so that the respective first alignment film 14 and second alignment film 22 may face each other. At this time, a pillar-shaped spacer integrally formed by resin material with one of the substrates is arranged between the first alignment film 14 of the array substrate AR and the second alignment film 22 of the counter substrate CT. Thereby, a predetermined gap, for example, 3-7 μm cell gap, is formed. The array substrate AR and the counter substrate CT are attached together by a seal material (which is not illustrated) in a state where the predetermined cell gap is formed. The liquid crystal material is injected into the cell gap. That is, the liquid crystal layer LQ is formed of a positive type liquid crystal material held between the array substrate AR and the counter substrate CT.

A first polarizing plate PL1 is attached by adhesives, etc., on one external surface of the liquid crystal display panel LPN, that is, the external surface of the first insulating substrate 10 which constitutes the array substrate AR. Moreover, a second polarizing plate PL2 is attached by adhesives, etc., on the external surface of another side of the liquid crystal display panel LPN, that is, the external surface of the second insulating substrate 20 which constitutes the counter substrate CT.

In this embodiment, a normally black mode is adopted. The first and second polarizing plates PL1 and PL2 are arranged so that the respective absorption axis of the first polarizing plate PL1 and the absorption axis of the second polarizing plate PL2 cross orthogonally.

Namely, at the time of non-electric field state, i.e., when a potential difference is not formed between the pixel electrode PE and the counter electrode CE, the liquid crystal molecules of the liquid crystal layer LQ are aligned in a parallel direction with the first direction RB1 and the second direction RB2. In this state, since the light from the back light 4 does not penetrate the second polarizing plate PL2, a black image is displayed in the pixel PX.

On the other hand, when the potential difference is formed between the pixel electrode PE and the counter electrode CE, the liquid crystal molecule is aligned so that the long axis of the molecule is aligned with the direction of electric field approximately in parallel. For example, when the lateral electric field is formed between the first main electrode PA and the second main electrode CA1, and between the first main electrode PA and the second main electrode CA2, the liquid crystal molecule is aligned along with the electric field. For this reason, in the transmitting portions respectively formed between the first main electrode PA and the second main electrodes CA1 and CA2, the light from the back light 4 penetrates, and white image is displayed in the pixel PX. At this time, the main alignment direction of the liquid crystal molecules in each transmitting portion is approximately in parallel with the first direction X as shown in an arrow D1 or an arrow D2 in FIG. 4, respectively. That is, in each pixel PX, when the electric field is formed between the pixel electrode PE and the counter electrode CE, the molecules are aligned in dual directions by being divided into two directions.

In the vicinity of the first main electrode PA and second main electrodes CA1 and CA2, since the lateral electric field is hardly formed or sufficient electric field to drive the liquid crystal molecule is not formed at this time, the liquid crystal molecule hardly moves from the first and second rubbing directions RB1 and RB2 like in the state of non-electric field. For this reason, although the first main electrode PA and the second main electrodes CA1 and CA2 are formed of the transmissive electric conductive material, the light from the back light does not penetrate in the regions. Therefore, the regions do not contributed to the display (i.e., black is displayed).

Although the electric field is formed between the first sub-electrode PB and the second main electrodes CA1 and CA2, since the vertical electric field is formed between the vicinity of the both ends of the first sub-electrode PB and the second main electrodes CA1 and CA2, the liquid crystal molecule are aligned so that the molecules rise. Further, in the vicinity of the central portion of the second sub-electrodes PB, a sufficient lateral electric field to drive the liquid crystal molecule is not formed. Accordingly, in the region near the first sub-electrode PB, the light from the back light does not penetrate, and the regions do not contribute to the display.

According to the first embodiment, since the first sub-electrode PB is arranged above the gate line G1, the electric field from the gate line G1 is shield with the first sub-electrode PB. Accordingly, an undesirable bias impressed from the gate line G1 to the liquid crystal layer LQ, is suppressed, and consequently, it becomes possible to suppress a defected display, such as burn-in image. Therefore, the high quality liquid crystal display device can be offered.

In this embodiment, in case a line inversion drive or a dot inversion drive is used, the polarity of the voltage impressed to the pixel electrode PE of the PX with respect to the potential of the counter electrode CE becomes a reverse polarity of the voltage impressed to the pixel electrode PE of the pixel PX which adjoins in the second direction Y shown in FIG. 3 (i.e., the polarity of the liquid crystal drive voltage is reversed between adjoining row lines).

At this time, in case the liquid crystal drive voltage of one pixel PX is a positive polarity, and the liquid crystal drive voltage of another adjacent pixel PX in the second direction Y is a negative polarity, a strong lateral electric field is formed between the pixels. For example, when the potential of the counter electrode CE is set to 0V, the voltage impressed to the pixel electrode of one pixel is +5V, and the voltage impressed to the pixel electrode of another pixel is −5V, a strong lateral electric field is formed due to the potential difference between the pixel electrodes PE. However, the direction of the lateral electric field is along with the second direction Y, and differs from the direction (the first direction X) of the lateral electric field between the first main electrode PA and the second main electrode CA1, and between the first main electrode PA and the second main electrode CA2 required to drive the liquid crystal molecules in the pixel PX. Under such undesirable influence of the lateral electric field, a portion of the liquid crystal molecules near the boundary between the adjoining pixels PX, is aligned to a direction which does not contribute to the display (generation of a dark line), and there is a possibility of a causing reduction in transmissivity.

According to this embodiment, the first sub-electrode PB is arranged at one end portion of the pixel PX, i.e., near the boundary between the pixels PX which adjoin in the second direction Y. The electric field formed between the first sub-electrode PB and the second main electrodes CA1 and CA2 suppresses the generation of undesirable electric field between the pixels which adjoin in the second direction Y. Accordingly, although the region on the first sub-electrode PB does not contribute to the display as mentioned-above, the peripheral region of the first sub-electrode PB contributes to the display because the peripheral region is not affected by the electric field between the pixels which adjoin in the second direction Y. Accordingly, the generation of a dark line can be suppressed, and it becomes possible to improve the transmissivity as compared with the case where the pixel electrode PE does not have the first sub-electrode PB In addition, even if it is a state where a potential difference is formed between the pixel electrode PE and the counter electrode CE, the liquid crystal molecules of a region which overlaps with the first main electrode PA and the second main electrodes CA1 and CA2 is not aligned to the direction which contributes to the display in many cases. For this reason, the pixel electrode PE and the counter electrode CE do not necessarily need to be formed of a transparent electric conductive material, and may be formed using electric conductive materials, such as, aluminum and silver.

Moreover, the second main electrodes CA1 and CA2 are arranged above the source lines S1 and S2 (that is, the position which faces the source line S1 and S2), respectively. The source line S is formed of the electric conductive material with light blocking characteristics. Accordingly, even if the liquid crystal molecules of a region which overlaps with the second main electrodes CA1 and CA2 are aligned to the direction in which the liquid crystal molecules do not contribute to the display, the alignment hardly affects the transmissivity of the pixel PX. Rather, the transmissivity of the pixel PX is improved as compared with the case where the second main electrodes CA1 and CA2 are arranged closer to the first main electrode PA side rather than on the source lines S1 and S2.

Moreover, it becomes possible to expand the distance between the first main electrode PA and the second main electrodes CA1 and CA2 by arranging the second main electrodes CA1 and CA2 on the source lines S1 and S2, and consequently, it becomes possible to form the lateral electric field with more horizontal directional property. For this reason, a wide viewing angle, which is an advantage of the lateral electric field mode, such as the conventional IPS mode, is also maintained.

In addition, when an alignment shift between the array substrate AR and the counter substrate CT occurs, a difference may arise in the distance between the first main electrode PA and the second main electrodes CA1 and CA2 of the both sides which sandwich the first main electrode PA. However, since the alignment shift is produced in common to all the pixels PX, there is no difference in the electric field distribution between the pixels PX, and the display of the images is not affected.

Next, a second embodiment is explained. This embodiment is different from the first embodiment in that the respective shapes of the pixel electrode PE and the counter electrode CE differ as compared with the first embodiment. In addition, in this embodiment, the same referential mark is denoted for the same structure as the first embodiment, and the detailed explanation is omitted about the same structure.

Figure 6:
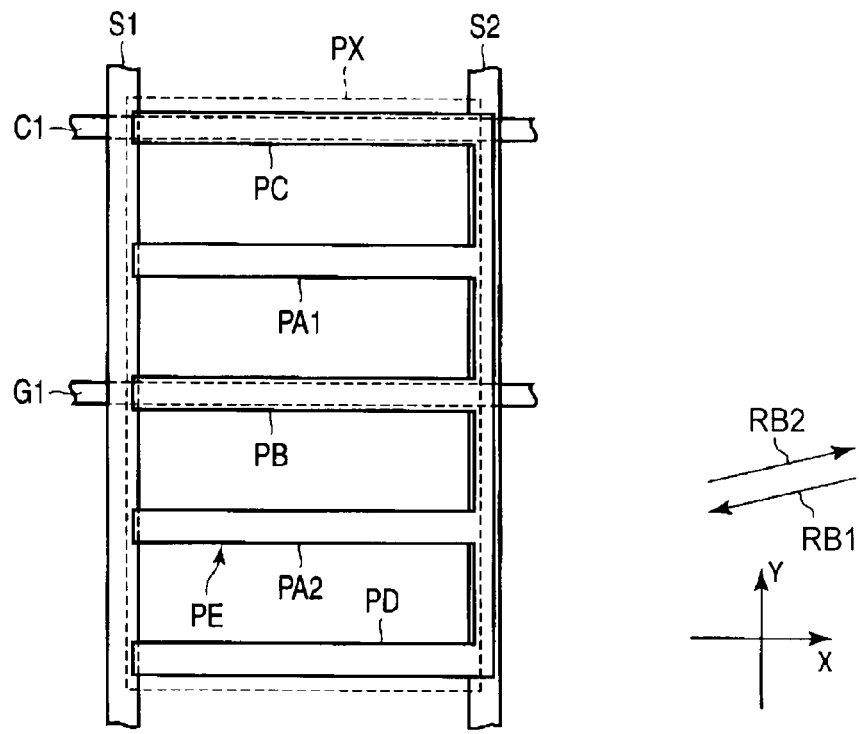
FIG. 6 is a plan view schematically showing the structure of the array substrate in which the pixel of the liquid crystal display panel is looked from the counter substrate side according to a second embodiment.

FIG. 6 is a plan view schematically showing the structure of the array substrate AR when the pixel PX of the liquid crystal display panel LPN in the second embodiment is looked from the counter substrate CT side.

The gate line G1 and the auxiliary capacitance line C1 extend in the first direction X, respectively. The source lines S1 and S2 extend in the second direction Y, respectively. In the illustrated example, the gate line G1 is arranged approximately in the center of the pixel PX, and the auxiliary capacitance line C1 is arranged at another end portion of the pixel PX.

The pixel electrode PE includes the first main electrodes PA1 and PA2, the first sub-electrode PB, the capacitance portion PC, and an end electrode PD as comb-like electrodes. In addition, in the illustrated example, although two first main electrodes are formed, one, or three or more first main electrodes may be used, and the shape of the pixel electrode PE is not limited to the illustrated example.

The capacitance portion PC, the first main electrode PA1, the first sub-electrode PB, the first main electrode PA2, and the end electrode PD are located extending in the first direction X in this order and along the second direction Y at an approximately regular interval, and are arranged in parallel each other. The first main electrodes PA1 and PA2, the first sub-electrode PB, the capacitance portion PC, and the end electrode PD are integrally formed, and are electrically connected each other, for example, on the source line S2 as shown in the figure.

Hereinafter, each comb-like electrode is explained more specificaly. The first main electrodes PA1 and PA2 are in a belt-like shape linearly extending in the first direction X, respectively. The first main electrodes PA1 and PA2 extend between the source line S1 and the source line S2. The first main electrode PA1 is located in the approximately middle portion between the first sub-electrode PB and the capacitance portion PC. The second main electrode PA2 is located in the approximately middle portion between the first sub-electrode PB and the end electrode PD.

The first sub-electrode PB is formed in a belt-like shape linearly extending in the first direction X. The first sub-electrode PB is arranged in an approximately central portion of the pixel PX, and is located in the approximately middle portion between first main electrode PA1 and the first main electrode PA2. The first sub-electrode PB covers the gate line G1 between the source line S1 and the source line S2.

That is, the length of the first sub-electrode PB is set to be equal to or longer than the length of the gate line G1 between the source line S1 and the source line S2 in the first direction X. Furthermore, the width along with the second direction Y of the first sub-electrode PB is set to be equal to or longer than that of the gate line G1 along with the second direction Y. That is, the gate line G1 is not exposed from the first sub-electrode PB between the source line S1 and the source line S2.

The capacitance portion PC is formed in a belt-like shape linearly extending in the first direction X. The capacitance portion PC is arranged on the auxiliary capacitance line C1 at another end portion of the pixel PX. The end electrode PD is formed in a belt-like shape linearly extending in the first direction X. The end electrode PD is arranged at one end portion of the pixel PX.

The first rubbing direction RB1 and the second rubbing direction RB2 are in parallel and in reverse each other like the first embodiment. Moreover, the first rubbing direction RB1 and the second ribbing direction RB2 are slightly inclined, i.e., by several degrees with respect to the first direction X, and the angle made by the first rubbing direction RB1 and the second rubbing direction RB2 is 7 degrees with respect to the first direction X.

Figure 7:
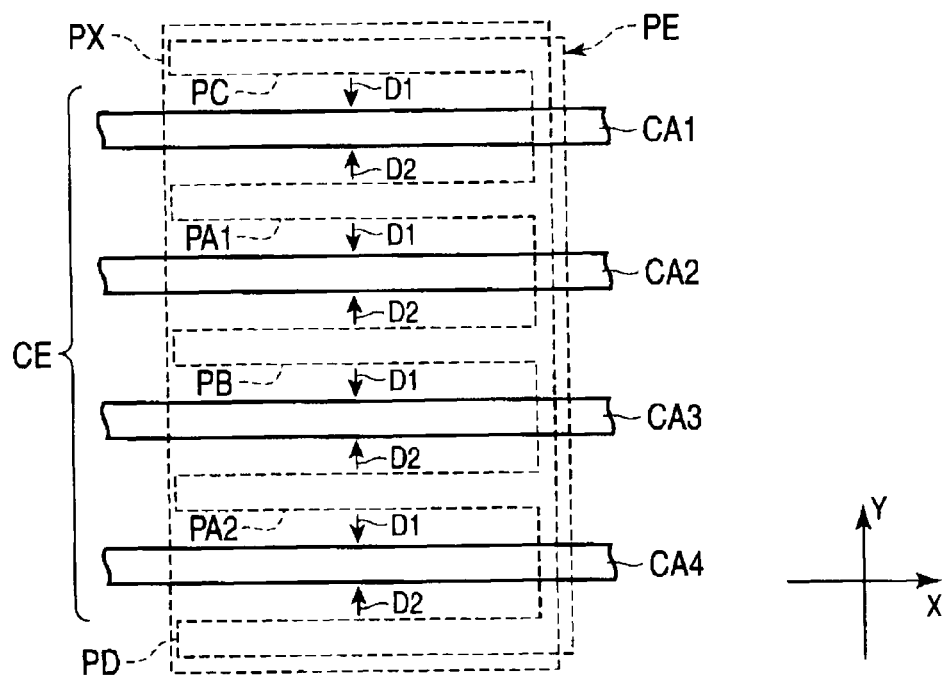
FIG. 7 is a plan view schematically showing the structure of the pixel in the counter substrate of the liquid crystal display panel according to a second embodiment.

FIG. 7 is a plan view schematically showing the structure of the pixel PX in the counter substrate CT of the liquid crystal display panel LPN according to the second embodiment.

The counter electrode CE includes a plurality of second main electrodes CA1 to CA4. In addition, in the illustrated embodiment, although four second main electrodes are formed, the number of the second main electrodes can be suitably changed according to the shape of the pixel electrode PE. The second main electrodes CA1 to CA4 are located linearly extending in the first direction X with an approximately regular interval along the second direction Y, and are arranged in parallel each other.

The second main electrodes CA1 to CA4 are formed in a belt-like shape linearly extending in the first direction X. That is, the second main electrodes CA1 to CA4 are arranged substantially in parallel with each tomb-like electrode of the pixel electrode PE (i.e., the first main electrodes PA1 and PA2, the first sub-electrode PB, the capacitance portion PC, and the end electrode PD). Moreover, the second main electrodes CA1 to CA4 are located by turns without overlapping with each tomb-like electrode of the pixel electrode PE, keeping an interval with each tomb-like electrode along the second direction Y.

That is, the second main electrode CA1 is arranged in the approximately middle between the capacitance portion PC and the first main electrode PA1. The second main electrode CA2 is arranged in the approximately middle between the first main electrode PA1 and the first sub-electrodes PB. The second main electrode CA3 is arranged in the approximately middle between the first sub-electrode PB and first main electrode PA2. The second main electrode CA4 is arranged in the approximately middle between the first main electrode PA2 and the end electrode PD.

The transmitting portions which mainly contribute to the display in the pixel PX are respectively formed between each tomb-like electrode of the pixel electrode PE and the second main electrodes CA1 to CA4. The main alignment direction of the liquid crystal molecules is a direction shown by the arrow D1 or the arrow D2 in the figure approximately in parallel with the second direction Y in each of the transmitting portion in which the electric field is formed between the pixel electrode PE and the counter electrode CE. That is, the liquid crystal molecules are aligned in two directions in each pixel PX.

According to the second embodiment, since the first sub-electrode PB is arranged on the gate line G1 like the first embodiment, the electric field from the gate line G1 is shield with the first sub-electrode PB. Accordingly, undesirable bias impressed from the gate line G1 to the liquid crystal layer LQ, is suppressed, and consequently, it becomes possible to suppress a defected display, such as burn-in image. Therefore, the high quality liquid crystal display device can be offered.

Moreover, in this embodiment, the end electrode PD is arranged at one end portion of the pixel PX i.e., near the boundary between the adjacent pixels PX which adjoin in the second direction Y. Accordingly, even when the line inversion or the dot inversion is used, the electric field formed between the end electrode PD and the second main electrode CA4 suppress the generation of undesirable electric field between the pixels PX which adjoin in the second direction Y. For this reason, also in the vicinity of the boundary between the adjacent pixels PX, the liquid crystal molecules are not affected by the electric field between the pixels PX which adjoin in the second direction Y, and the generation of the dark line can be suppressed. Therefore, as compared with the case where the pixel electrode PE does not have the end electrode PD, it becomes possible to improve more the transmissivity.

Next, the third embodiment is explained. The third embodiment is different from the first and second embodiments in that the shape of the pixel electrode PE and the counter electrode CE differs as compared with the first and second embodiments. In addition, in this third embodiment, the same referential mark is denoted for the same structures as the first and second embodiments, and the detailed explanation is omitted.

Figure 8:
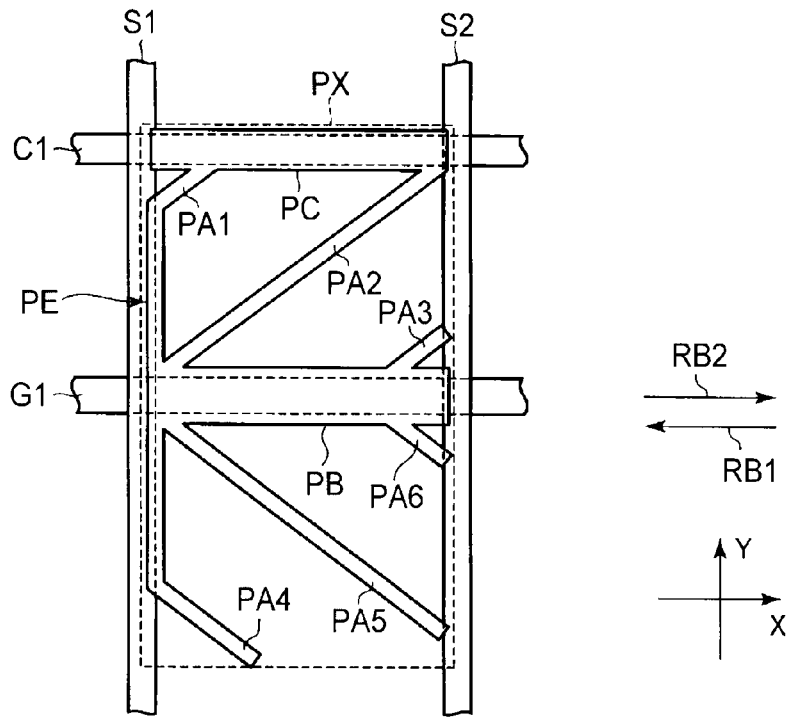
FIG. 8 is a plan view schematically showing the structure of the array substrate in which the pixel of the liquid crystal display panel is looked from the counter substrate side according to a third embodiment.

FIG. 8 is a plan view schematically showing the structure of the array substrate AR when the pixel PX of the liquid crystal display panel LPN is looked from the counter substrate CT side.

The gate line G1 and the auxiliary capacitance line C1 extend in the first direction X, respectively. The source lines S1 and S2 extend in the second direction Y, respectively. In the illustrated example, the gate line G1 is arranged approximately in the center of the pixel PX, and the auxiliary capacitance line C1 is arranged at another end portion of the pixel PX.

The pixel electrode PE includes first main electrodes PA1 to PA6, the first sub-electrode PB, and the capacitance portion PC. In addition, in the illustrated example, although six first main electrodes are formed, the number of the first main electrodes is not limited to this example. The first main electrodes PA1 to PA6, the first sub-electrode PB, and the capacitance portion PC are integrally formed, and are electrically connected each other, for example, on the source line S1 like the illustrated example.

The first main electrodes PA1 to PA6 are formed in a belt-like shape linearly extending in an oblique direction which crosses the first direction X and the second direction Y, respectively. The first main electrodes PA1 to PA3 are arranged at the upper half portion of the pixel PX between the first sub-electrode PB and the capacitance portion PC with an approximately regular interval, and they are arranged approximately in parallel each other. The first main electrode PA4 to PA6 are arranged at the bottom half of the pixel PX with an approximately regular interval, and they are arranged approximately in parallel each other.

The direction along which the first main electrodes PA1 to PA3 extend is not in parallel with the direction along which the first main electrodes PA4 to PA6 extend. Furthermore, each of the first main electrodes PA1 to PA3 is respectively arranged in line symmetry with the first main electrodes PA4 to PA6 interposing the first sub-electrode PB arranged approximately in the center of the pixel PX.

The first sub-electrode PB is formed in a belt-like shape linearly extending in the first direction X. The first sub-electrode PB is arranged in an approximately central portion of the pixel PX, and covers the gate line G1 between the source line S1 and the source line S2. The length of the first sub-electrode PB is set to be equal to or longer than the length of the gate line G1 between the source line S1 and the source line S2 in the first direction X. Furthermore, the width along with the second direction Y of the first sub-electrode PB is set to be equal to or longer than that along with the second direction Y of the gate line G1. That is, the gate line G1 is not exposed from the first sub-electrode PB between the source line S1 and the source line S2.

The capacitance portion PC is formed in a belt-like shape linearly extending in the first direction X. The capacitance portion PC is arranged on the auxiliary capacitance line C1 at another end portion of pixel PX.

In addition, the first rubbing direction RB1 of the first alignment film and the second rubbing direction RB2 of the second alignment film are in parallel and in reverse each other like the first embodiment. The first and second rubbing directions RB1 and RB2 are substantially in parallel with the first direction X.

Figure 9:
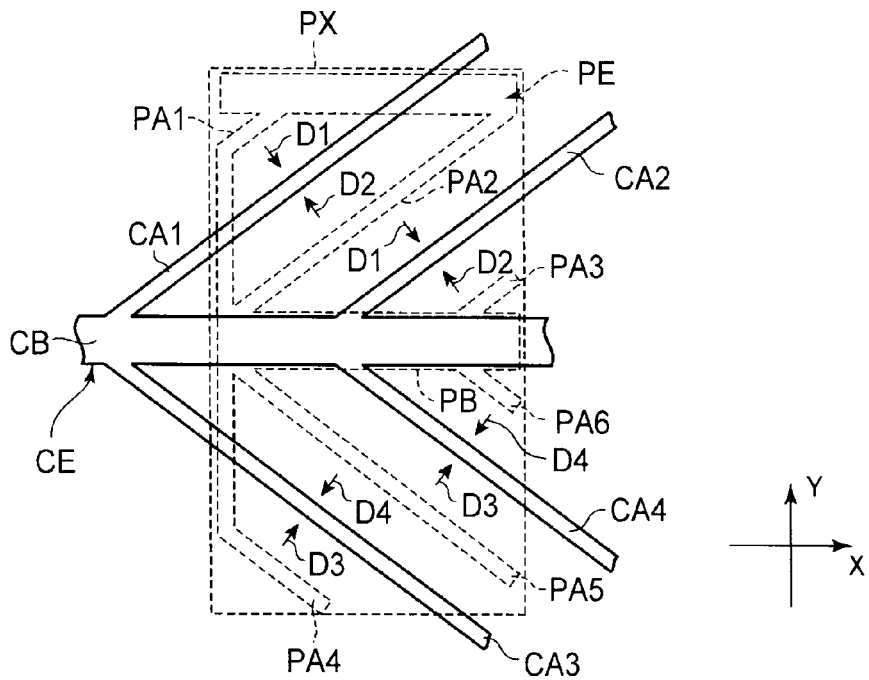
FIG. 9 is a plan view schematically showing the structure of the pixel in the counter substrate of the liquid crystal display panel according to the third embodiment.

FIG. 9 is a plan view schematically showing the structure of the pixel PX in the counter substrate CT of the liquid crystal display panel LPN according to the third embodiment.

The counter electrode CE includes a plurality of second main electrodes CA1 to CA4, and the first sub-electrode CB. In addition, in the illustrated example, although four second main electrodes are formed, the number of the second main electrodes can be suitably changed according to the shape of the pixel electrode PE. The second main electrodes CA1 to CA4 and the second sub-electrode CB are integrally formed, and are electrically connected each other.

The second main electrodes CA1 to CA4 are formed in a belt-like shape linearly extending in an oblique direction which crosses the first direction X and the second direction Y, respectively. The direction along which the second main electrodes CA1 and CA2 extend is not in parallel with the direction along which the first main electrodes CA3 and CA4 extend. Furthermore, each of the second main electrodes CA1 and CA2 is respectively arranged in line symmetry with the second main electrodes CA3 and CA4 interposing the second sub-electrode CB arranged approximately in the center of the pixel PX.

The second main electrode CA1 and CA2 are arranged at the upper half portion of the pixel PX with an approximately regular interval, in parallel mutually. Moreover, the second main electrodes CA1 and CA2 are arranged in parallel with the first main electrodes PA1 to PA3. Moreover, the second main electrodes CA1 and CA2 are located by turns without overlapping with the first main electrodes PA1 to PA3, keeping an approximately constant interval. That is, the second main electrode CA1 is located in an approximately middle portion between the first main electrode PA1 and the first main electrode PA2. The second main electrode CA2 is located in an approximately middle portion between the first main electrode PA2 and the first main electrode PA3.

The second main electrode CA3 and CA4 are arranged at the bottom half of the pixel PX with an approximately regular interval substantially in parallel mutually. Moreover, the second main electrodes CA3 and CA4 are arranged approximately in parallel with the first main electrodes PA4 to PA6. Moreover, the second main electrodes CA3 and CA4 are arranged by turns without overlapping with the first main electrodes PA4 to PA6, keeping an approximately constant interval. Namely, the second main electrode CA3 is located in an approximately middle portion between the first main electrode PA4 and the first main electrode PA5. The second main electrode CA4 is arranged in an approximately middle portion between the first main electrode PA5 and the first main electrode PA6.

The second sub-electrodes CB is formed in a belt-like linearly extending in the first direction X. The second sub-electrode CB is arranged on the first sub-electrode PB in an approximate central portion of the pixel PX.

The transmitting portions which mainly contribute to the display in the pixel PX are respectively formed between the first main electrodes PA1 to PA6 of the pixel electrode PE and the second main electrodes CA1 to CA4. When the electric field is formed between the pixel electrode PE and the counter electrode CE, the main alignment direction of the liquid crystal molecules in each transmitting portion is the direction shown in either of the arrows D1 to D4 in the figure. That is, the alignment of four directions is carried out in each pixel PX.

According to the third embodiment, since the first sub-electrode PB is arranged above the gate line G1 like the first embodiment, the electric field from the gate line G1 is shield with the first sub-electrode PB. Accordingly, the undesirable bias impressed from the gate line G1 to the liquid crystal layer LQ, is suppressed, and consequently, it becomes possible to suppress a defected display, such as burn-in image. Therefore, the high quality liquid crystal display device can be offered.

Moreover, according to this embodiment, four regions in which the alignment directions of the liquid crystal molecules are different are formed in one pixel PX, and moreover the area of each region is substantially the same. For this reason, it becomes possible for respective regions to optically compensate each other and to achieve a uniform display covering the wide viewing angle.

Moreover, according to this embodiment, since the first sub-electrode PB and the counter electrode CE are arranged so that the second sub-electrodes CB overlaps the counter electrode CE through the liquid crystal layer LQ in parallel, when a potential difference is formed between the pixel electrode PE and the counter electrode CE, a vertical electric field is formed therebetween. The vertical electric field divides the pixel PX into the upper half portion and the bottom half portion, and aligns the liquid crystal molecules to a perpendicular direction with respect to the substrate.

According to the operation by the vertical electric field, it becomes possible to maintain the state where the liquid crystal molecules are aligned to the direction of the arrow D1 or the arrow D2 in the upper portion half of the pixel PX, and to the direction of the arrow D3 or the arrow D4 in the bottom half portion of the pixel PX. Therefore, it becomes possible to form four regions respectively having same area in which the liquid crystal molecules are aligned to different four directions in one pixel PX. Accordingly, even if stress which presses the liquid crystal display panel LPN is applied, the generation of the alignment disorder of the liquid crystal molecules can be suppressed, and it becomes possible to return to the original alignment state in an instant.

Hereinafter, a comparison among the first and second embodiments, and comparative examples 1 and 2 is explained.

(First Example According to the First Embodiment)

The pixel electrode PE formed in the array substrate AR includes the first main electrode PA1 formed in the central portion between the two adjoining source line S1 and the source line S2, the first sub-electrode PB formed at one end portion of the first main electrode PA, and the capacitance portion PC formed in another end portion of the first main electrode PA. The width along with the first direction X of the first main electrode PA is set to 10 μm.

The counter electrode CE formed in the counter substrate CT includes the second main electrode CA formed on the source line S1 and the source line S2 in parallel with the first main electrode PA. The width along with the first direction X of the second main electrode CA is set to 10 μm.

The first alignment film 14 is formed on the surface of the array substrate AR. Moreover, the second alignment film 22 is formed on the surface of the counter substrate CT. The first and second alignment films 14 and 22 are formed by performing the rubbing processing, after applying the material which has horizontal alignment characteristics by a thickness of 70 nm. The first rubbing direction RB1 of the first rubbing film 14 and the second rubbing direction RB2 of the second rubbing film 22 were set to an 83-degree direction, when the first direction X was made into a 0-degree direction and the second direction Y was made into a 90-degree direction.

The array substrate AR and the counter substrate CT were attached together keeping the cell gap of 4.0 μm between the array substrate AR and the counter substrate CT. At this time, the interval of the first main electrode PA and the second main electrode CA was set to 10 μm. The Merck Co. made positive type liquid crystal material was injected in the gap between the array substrate AR and counter substrates CT, and the liquid crystal display panel LPN having a 40 μm pixel pitch was manufactured.

COMPARATIVE EXAMPLE 1

This comparative example 1 corresponds to a structure in which the first sub-electrode PB of the pixel electrode PE is omitted from the structure according to the first embodiment. The liquid crystal display panel LPN was produced like the above-mentioned first embodiment except for this point.

The transmissivity of the liquid crystal display panel LPN was measured when the same potential difference was applied between the pixel electrode PE and the counter electrode CE about each liquid crystal display panel LPN of the above-mentioned first embodiment and the comparative example 1. When the transmissivity obtained by the liquid crystal display panel LPN according to the comparative example 1 was set to 1, the transmissivity obtained by the liquid crystal display panel LPN according to the first embodiment was 1.3. According to the comparative experiment, it was confirmed that higher transmissivity can be obtained by the first embodiment.

(Second Example According to the Third Embodiment)

The pixel electrode PE formed on the array substrate AR includes the six first main electrodes PA1 to PA6 along the oblique direction, and the first sub-electrode PB and the capacitance portion PC formed along the first direction X.

The counter electrode CE formed in the counter substrate CT includes the four second main electrodes CA1 to CA4 formed along the first main electrode PA in parallel, and the second sub-electrodes CB formed along the first direction X.

The first alignment film 14 was formed on the surface of the array substrate AR. Moreover, the second alignment film 22 was formed on the surface of the counter substrate CT. The first and second alignment films 14 and 22 are formed by performing the rubbing processing after applying the material which has horizontal alignment characteristics by a thickness of 70 nm. The first rubbing direction RB1 of the first rubbing film 14 and the second rubbing direction RB2 of the second rubbing film 22 were set to an 0-degree direction, when the first direction X was made into a 0-degree direction and the second direction Y was made into a 90-degree direction.

The array substrate AR and the counter substrate CT were attached together keeping the cell gap of 4.0 μm between the array substrate AR and the counter substrate CT. At this time, the interval between the first main electrode PA and the second main electrode CA was set to 10 μm. The Merck Co. made positive type liquid crystal material was injected into the gap between the array substrate AR and counter substrates CT, and the liquid crystal display panel LPN having a 40 μm pixel pitch was manufactured.

COMPARATIVE EXAMPLE 2

This comparative example 2 corresponds to a structure in which the second sub-electrode CB of the counter electrode CE is omitted from the structure according to the second example. The liquid crystal display panel LPN was produced like the above-mentioned second example except for this point.

An alignment intensity of the liquid crystal molecules for the respective second example and comparative example 2 was measured when the same potential difference is applied between the pixel electrode PE and the counter electrode CE. Here, the alignment intensity was defined as follows. That is, the liquid crystal display panel LPN is observed when predetermined time has passed after applying stress to the liquid crystal display panel LPN, and a visual angle at which the trace of stress is sighted is defined as the alignment intensity. That is, if the stress is applied to the liquid crystal display panel LPN, the alignment disorder of the liquid crystal molecules occurs in the pixel PX. The alignment disorder may be restored to the original alignment state with progress of time, or the alignment disorder may be held after the alignment disorder has occurred. When the liquid crystal display panel LPN is observed, if the comparatively small-scale alignment disorder remains in the pixel PX, or the alignment disorder was restored to the original alignment state, the trace of the stress is not sighted even if the visual angle is gradually expanded from a normal line of the liquid crystal display panel LPN. However, if the comparatively large-scale alignment disorder remains in the pixel PX, the alignment disorder is sighted as the trace of stress by expanding the visual angle only slightly from the normal line of the liquid crystal display panel LPN. Thus, the larger the visual angle at which the trace of stress is sighted becomes, the higher the alignment intensity is. That is, the restoring force to return to the original alignment state and the alignment stability is high. Inversely, the smaller the visual angle at which the trace of stress is sighted, the lower the alignment intensity is.

In this experiment, while the trace of stress was sighted at a visual angle of about 20 degrees with respect to the normal line according to the comparative example 2, the trace of stress was not sighted in the second example, and it was confirmed that the alignment intensity is high even if the visual angle is expanded from the normal line to about 90 degrees in the example 2.

As explained-above, according to this embodiment, it is possible to improve the transmissivity and the alignment intensity, and the high quality liquid crystal display device can be offered.

Figure 10:
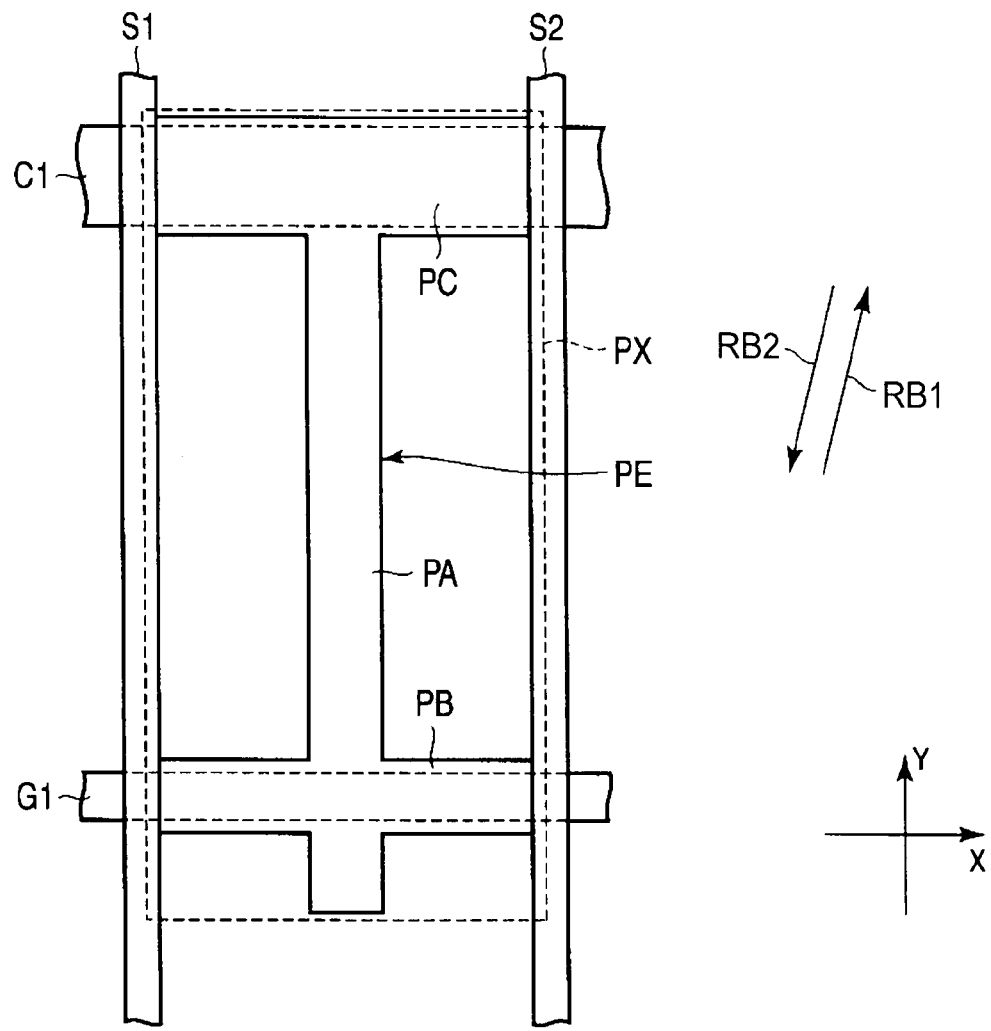
FIG. 10 is a plan view schematically showing the structure of the array substrate in which the pixel of the liquid crystal display panel according to a modification of the embodiment is looked from the counter substrate side.

In the first embodiment, the first sub-electrode PB and the gate line G1 are arranged at one end portion of the pixel PX. However, when the drive methods other than the line inversion drive or the dot inversion drive are applied, the first sub-electrode PB and the gate line G1 do not necessarily need to be arranged at the end portion of the pixel PX. For example, the first sub-electrode PB and the gate line G1 may be shifted to the central portion side rather than the end portion of the pixel PX as shown in FIG. 10. In this case, the first sub-electrode PB crosses the first main electrode PA. Even if the above structure is used, the same effect as the first embodiment is acquired because the first sub-electrode PB is arranged so as to cover the gate line G1.

While certain embodiments have been described, these embodiments have been presented by way of example only, and are not intended to limit the scope of the inventions. In practice, the structural elements can be modified without departing from the spirit of the invention. Various embodiments can be made by properly combining the structural elements disclosed in the embodiments. For example, some structural elements may be omitted from all the structural elements disclosed in the embodiments. Furthermore, the structural elements in different embodiments may properly be combined. The accompanying claims and their equivalents are intended to cover such forms or modifications as would fall with the scope and spirit of the inventions.

What is claimed is:

1. A liquid crystal display device formed of a plurality of pixels, comprising:
   a first substrate including:
      gate lines extending in a first direction,
      a capacitance line extending in the first direction,
      a first source line and a second source line extending in a second direction orthogonally crossing the first direction,
      a pixel electrode including a first belt-like main electrode arranged approximately in a central portion between the first source line and the second source line and extending in the second direction, and a first belt-like sub-electrode covering the gate line between the first source line and the second source line and extending in the first direction, and
      a second belt-like sub-electrode covering the capacitance line between the first source line and the second source line on an opposite side of the first belt-like main electrode than the first belt-like sub-electrode, the second belt-like sub-electrode being substantially a same length as the first belt-like sub-electrode;
   a second substrate including a counter electrode having a second main electrode arranged on the first and second source lines and extending in the second direction; and
   a liquid crystal layer held between the first substrate and the second substrate;
   the length of the first belt-like sub-electrode is approximately equal to or longer than the length of the gate line between the first and second source lines in the first direction, the width along with the second direction of the first belt-like sub-electrode is approximately equal to or longer than the width of the gate line along with the second direction, and
   the length of the second belt-like sub-electrode is approximately equal to the length between the first and second source lines in the first direction.

2. The liquid crystal display device according to claim 1, wherein the gate line and the first sub-electrode are arranged at one end portion of the pixel, and a line inversion drive or a dot inversion drive is employed.

3. The liquid crystal display device according to claim 1, wherein the capacitance line is arranged at another end of the pixel.

4. The liquid crystal display device according to claim 1, wherein a transmitting portion to contribute to an image display is formed between the first main electrode and the second main electrode.

5. The liquid crystal display device according to claim 1, wherein
   the first substrate further includes a first alignment film to which a rubbing processing is performed in a first rubbing direction, and covering the pixel electrode,
   the second substrate further includes a second alignment film to which a rubbing processing is performed in a second rubbing direction which is a reverse direction and in parallel with the first rubbing direction, and covering the counter electrode, and
   the first and second rubbing directions respectively cross the first and second main electrodes at an angle.

* * * * *